United States Patent [19]

Weber et al.

[11] 4,037,325
[45] July 26, 1977

[54] LINEAR GLASS SCALE HEIGHT GAGE

[75] Inventors: Ernest G. Weber, Fairport; John W. Balliett, Penfield; John M. Lacagnina, Henrietta; Bruce R. Robinson, Penfield, all of N.Y.

[73] Assignee: Quality Measurement Systems, Inc., Penfield, N.Y.

[21] Appl. No.: 667,385

[22] Filed: Mar. 16, 1976

Related U.S. Application Data

[63] Continuation-in-part of Ser. No. 540,523, Jan. 13, 1975, abandoned.

[51] Int. Cl.² ............................ G01B 7/02; G01B 5/02
[52] U.S. Cl. ................................ 33/125 C; 33/147 N; 33/172 E; 33/DIG. 3; 250/237 G
[58] Field of Search .................... 33/1 D, 1 L, 125 A, 33/125 C, 143 L, 147 N, 172 E, 174 L, DIG. 3; 250/237 G

[56] References Cited

U.S. PATENT DOCUMENTS

| | | | |
|---|---|---|---|
| 2,857,802 | 10/1958 | Cail | 33/125 C |
| 3,142,121 | 7/1964 | Stefanov | 33/143 L |
| 3,244,063 | 4/1966 | Lawrence | 33/1 L |
| 3,533,703 | 10/1970 | Wingate | 250/237 G |
| 3,738,753 | 6/1973 | Huntley, Jr. | 250/237 G |
| 3,749,501 | 7/1973 | Weig | 250/237 G |
| 3,812,352 | 5/1974 | MacGovern | 250/237 G |
| 3,867,037 | 2/1975 | Litke | 33/125 C |
| 3,924,337 | 12/1975 | Taylor | 33/172 E |

*Primary Examiner*—Richard E. Aegerter
*Assistant Examiner*—Richard R. Stearns
*Attorney, Agent, or Firm*—Stonebraker, Shepard & Stephens

[57] ABSTRACT

Apparatus for measuring which is adapted for use with a remote digital readout. The measuring apparatus includes an elongated main beam and a measuring device slidably mounted on the beam. The beam includes a transparent ruled scale with markings positioned thereon corresponding to different measurements. Mounted within the device is an electro-optical decoder suspended by a unique flexure arrangement which detects marks as the device is slidably moved on the beam and produces electrical signals which are provided to the remote digital readout system which in turn produces a visual readout of measurement. The measuring device includes a second reader scale having similar markings thereon. In particular, the ruled or measurement scale has markings or lines that are disposed substantially parallel to each other and equally spaced with a first period (number of lines per unit distance), while the markings or lines of the reader scale are disposed parallel to each other and equally spaced with a second, different period (number of lines per unit distance) so that a Moiré fringe pattern is established when a source of light is directed therethrough, the fringes of which are spaced in accordance with the difference in scale period.

4 Claims, 10 Drawing Figures

LINEAR GLASS SCALE HEIGHT GAGE

CROSS-REFERENCE TO RELATED APPLICATIONS

This application is a continuation-in-part of application Ser. No. 540,523, now abandoned entitled "Linear Glass Scale Height Gage", filed Jan. 13, 1975.

DISCUSSION OF THE PRIOR ART

In one common form of height measuring devices (such as shown in U.S. Pat. No. 3,667,561 to Hutchinson et al.), a height measuring device having a pointer is mounted for slidable movement on a main beam or pillar relative to a fixed base, to measure the height of an object placed on the base. Often a vernier scale has to be visually read to determine the object height. With such an arrangement, there can be frequent operator interpolation error. To overcome this problem, height gages which employ a digital readout device are in use. A digital height gage Model 507-224, manufactured by Mitutoyo, includes a rack and pinion arrangement mounted on the main beam and the measuring device, respectively. As a knob on the device is turned, the rack and pinion move the device through a gear mechanism in a vertical direction; and at the same time, a disc encoder provides electrical signals to a digital output device which produces a visual output. This device has inherent inaccuracy due to gear backlash. Moreover, to provide for fine scale reading, another fine adjustment knob is provided which requires visual readout in the manner similar to that discussed above. In view of the foregoing, this device still may produce errors.

Further, it is known to use a pair of transparent scales having markings thereon, wherein a first or ruled measurement scale is mounted to be stationary with respect to a reference surface and a second or reader scale is disposed upon a carriage movable with respect to the reference surface; both of the scales are transparent, typically made of glass, and are ruled with closely-aligned, parallel markings or lines. The scale markings of the reader and measurement scales are of the same number of lines per unit distance, but are disposed at an angle $\theta$ with respect to each other, as will be explained below. A source of a narrow beam of illumination is directed through the scales to produce what typically is known as a Moiré pattern of fringes or shadows, as shown in FIG. 4A, where the fringes $43'a$ and $43'b$ of the pattern are spaced a distance 4A apart. In order to detect the fringes as they are produced, a pair of photosensors $33'$ and $34'$ are disposed a distance A apart. It is typical of the prior art to establish such a Moiré pattern by aligning the markings of the reader and measurement scales at the selected angle $\theta$, whereby the distance A that the photosensors $33'$ and $34'$ are spaced apart, is determined by the following formula:

$$A = \frac{P}{(2\sin \frac{\theta}{2}) \cdot 4},$$

where P equals the period of the scale lines, and $\theta$ equals the angle between the lines on the reader and measurement scales. For small angles of $\theta$, the following equation applies:

$$4A \simeq \frac{P}{\theta}$$

Thus, the fringe spacing (and consequently the actual relative motion between scales) is linearly proportional to the angle $\theta$ between scales, for small angles of $\theta$. This results in incorrect distance measurement if the scales are not kept perfectly aligned.

As will be explained later in detail, the measurement scale is held stationary, whereas the reader scale is disposed upon a carriage movable with respect to the measurement scale and typically is disposed by a spring toward the measurement scale in a manner to permit the relative movement of the two scales with respect to each other and yet permit an approximate alignment therebetween. However, with use, the reader scale may be misaligned and in particular, may be rotated or askewed with respect to the measurement scale such that the original angle $\theta$ established between the markings of the measurement and reader scales is changed, such that a new Moiré pattern is established, as shown in FIG. 4B. For example, the angle $\theta$ may be so changed that the spacing between the fringes or shadows $43'a$ and $43'b$ is B, and the spacing A between the photosensors $33'$ and $34'$ as originally established, is obviously inappropriate to detect the new Moiré pattern. As a result, the outputs of each of the photosensors $33'$ and $34'$ are disposed out-of-phase with respect to each other, and an incorrect indication of measurement results.

SUMMARY OF THE INVENTION

It is an object of this invention to provide a measuring gage which minimizes errors found in the prior art.

In accordance with a disclosed embodiment of the invention, there is provided a measuring device mounted for slidable movement on the main beam of a support (which includes a base). A transparent ruled scale having precisely located marks is mounted on the beam and an electrooptical decoder in the device decodes the marks and produces output electrical signals. In response to such output signals, a digital readout system produces a visual display, thereby eliminating operator interpolation error. Because no gears or racks and pinions are used, prior art backlash errors are completely eliminated.

The device includes a carriage slidably mounted on the main beam with a flexure member that urges a reader scale into alignment with the ruled scale. Mounted on the device but disposed behind the transparent ruled measurement scale is a very narrow beam light source, such as an LED (light-emitting diode), which illuminates marks on the ruled scale as the device is moved, resulting in interference patterns. At least one first photosensor also mounted on the front face of the reader scale receives light from the source. Movement of the two scales relative to each other produces the vernier fringe which modulates the intensity of the light as seen by the photosensor. In response to such modulation, the first photosensor produces a somewhat sinusoidal electrical signal. A second photosensor, in accordance with the invention, also may be positioned along the front face of the reader scale to receive scale-modulated light from the source and produce a signal 90° out-of-phase with the first signal. With this arrangement, the cummulative number of cycles of either of the electrical signals represents the distance of travel, and the phase relationship between the signals represents the relative direction of travel.

In a further feature of this invention, the scale markings or lines are placed upon the reader and measurement scales in a manner whereby even significant axial misalignments of the scales will not result in inaccurate measurement readings. In particular, scale lines of a first period in terms of the number of lines per unit distance, are placed upon the measurement scale, and scale lines of a second, different period of lines per unit distance, are placed upon the reader scale, the difference in the line periods being equal to $\frac{1}{4}$A. In this embodiment, the photosensors are placed a distance apart equal to A', where 4A' equals the reciprocal of the aforementioned difference in line periods.

Features and advantages of the present invention include:

1. The elimination of a precision ground rack (which is considerably more expensive than a ruled scale).
2. The elimination of gear backlash.
3. The provision of a flexure/bearing spacer arrangement, in accordance with the invention, which provides precision spacing required between the reader scale and the measurement scale.
4. Improved measurement accuracy over temperature variations.
5. Improved measurement apparatus using aligned reader and measurement scales to achieve significant measurement accuracy, that is not susceptible to measurement inaccuracy due to misalignment of the scales and in particular, the askewing of the lines of the reader and measurement scales at some angle $\theta$.

DETAILED DESCRIPTION OF THE PREFERRED EMBODIMENTS

Figure 1:
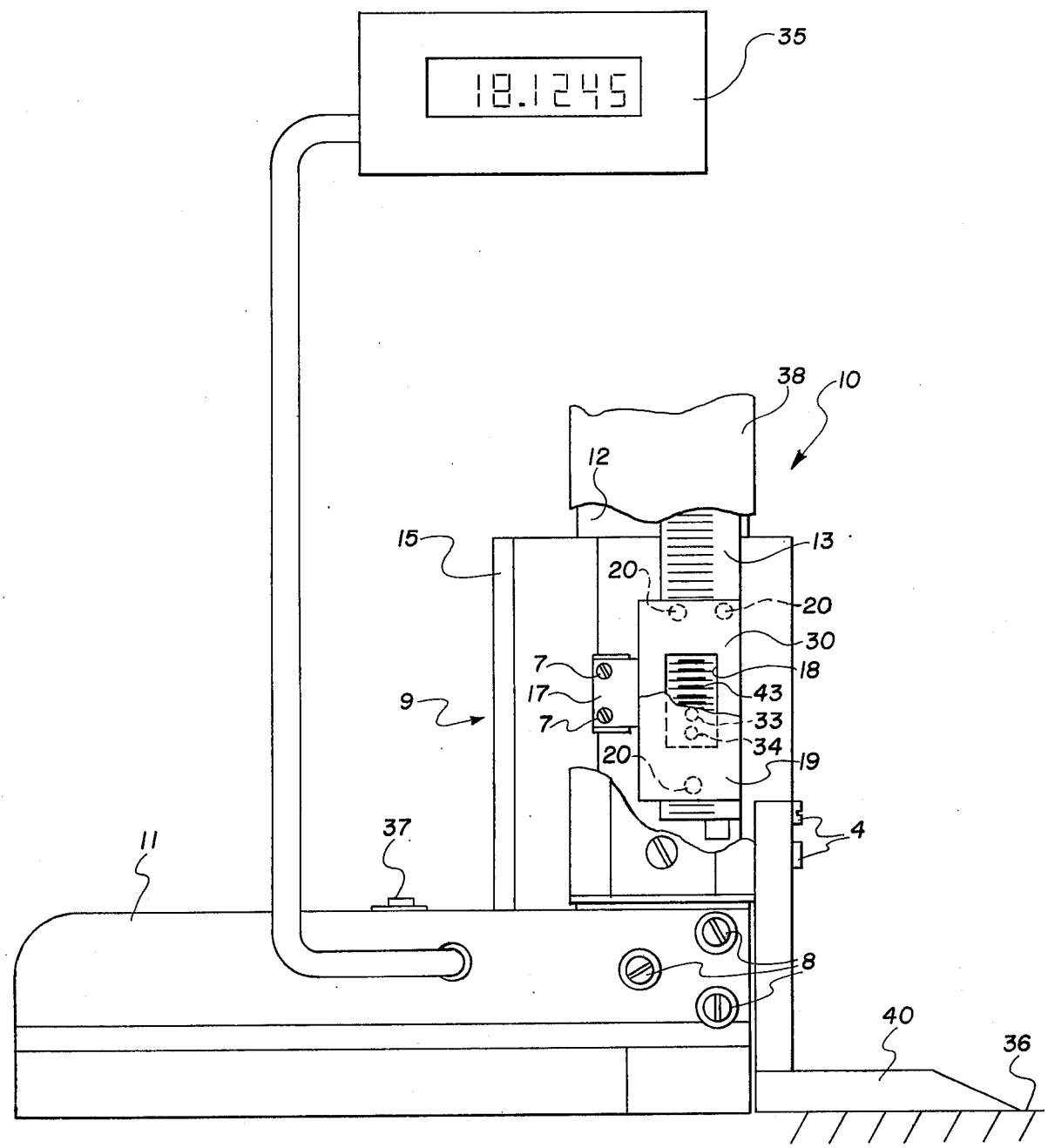
FIG. 1 is a side view of a height gage embodying the invention.
Figure 2:
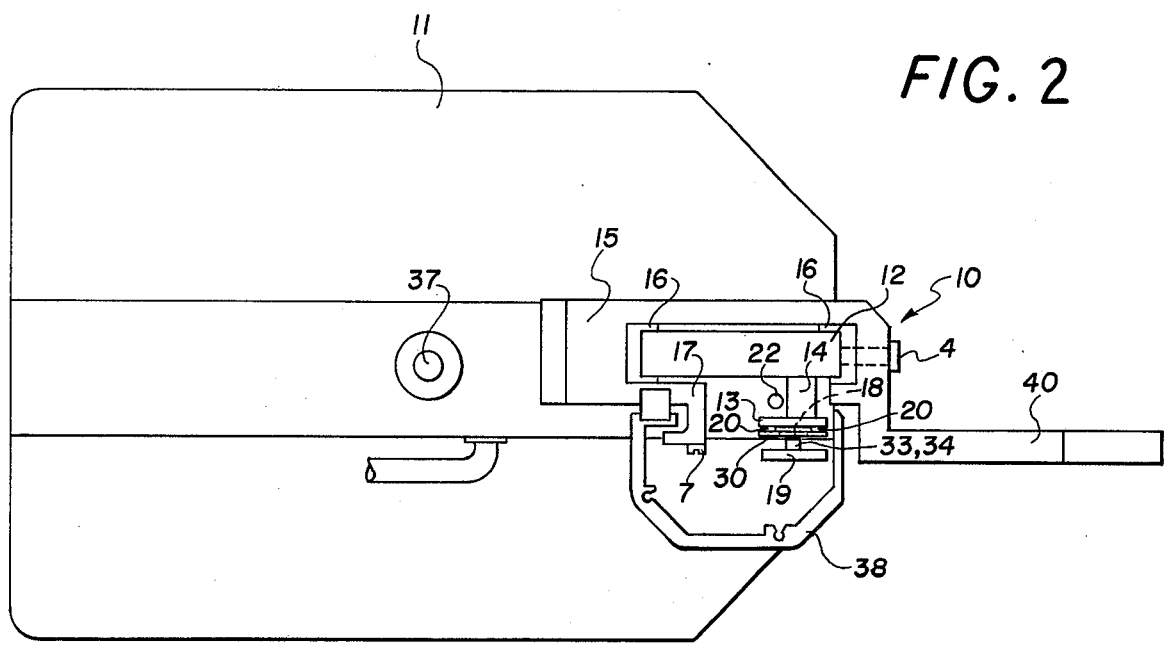
FIG. 2 is a top view of the height gage of FIG. 1.

A height gage 10 is shown in FIGS. 1 and 2 to include a base 11 to which an elongated main beam 12 is attached by alignment screws 8. The beam 12 is disposed perpendicularly to the base 11. A ruled translucent glass measurement scale 13 is fixedly secured to the main beam 12 by means of a scale support member 14 which may be welded to the main beam 12 while the measurement scale 13 may be glued to the support member 14.

Figure 6:
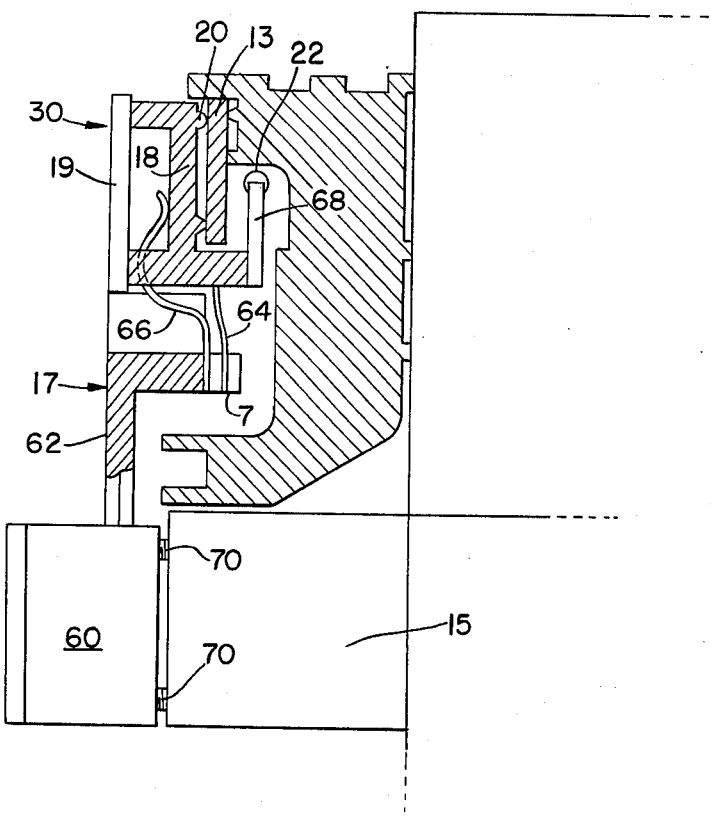
FIG. 6 is a sectioned view of FIG. 1, showing in detail the manner of interconnection between the carriage and the reader head.

The measurement scale 13 is disposed parallel to the length of the main beam 12 and perpendicular to the base 11. A height measurement device 9 includes a carriage 15 which cooperates with channel-shaped carriage bearings 16 which are glued to the carriage 15 and may be made of a bearing material to permit the carriage 15 to slide uniformly over the main beam 12. The fit between the bearings and the main beam 12 prevents the carriage 15 from slipping from a position it has been moved to. A flexure assembly 17, as more fully shown and described with respect to FIG. 6, is fixedly secured by welding to the carriage 15, and holds a reader head 30, reader scale 18 and processing electronics printed circuit board 19 in the appropriate position with the aid of bearing/spacers 20. The bearing/spacers 20 are small pads made out of a suitable bearing material. The flexure assembly 17 is fixed relative to the carriage 15 in a direction parallel to the measurement scale 13 and resiliently urges the bearing/spacers 20 in contact with the measurement scale 18, thereby maintaining constant spacing between the reader and measurement scales for proper fringe contrast.

Referring to FIG. 6, there is provided a more detailed view of the flexure assembly 17 and the reader head 30. In particular, the flexure assembly 17 includes a L-shaped support member 62 fixedly secured, as by welding, to a reader head casting 60, which in turn is variably spaced from the carriage 15 by a pair of selectively adjusted set screws 70. Further, there is included a flexure hinge 64 and a flexure spring 66, one end of both being secured by a machine screw 7 to the other end of the L-shaped support member 62. The other end of the flexure hinger 64 is disposed about and is secured to the reader head 30, whereas the the other end of the flexure spring 66 exerts a biasing action on the reader head 30 in a direction toward the measurement scale 13. As shown in FIG. 6, the lamp 22 is mounted upon the reader head 30 by a support member 68 and the circuit board 19 is suitably secured upon the front face thereof. As appreciated from FIG. 6, the set screws 70 serve to adjust the spacing of the reader head casting 60 and therefore the reader head 30, with respect to the carriage 15, so that the adjacent surfaces of the measurement scale 18 and the ruled measurement scale 13 are substantially parallel with respect to each other. Mounted on the printed circuit board 19 at a position spaced from the reader scale 18 are photosensors 33 and 34. The photosensors 33 and 34 are positioned to detect or sense interference fringes 43 (see FIG. 1) between the reader scale 18 and the measurement scale 13. These interference fringes move past the photosensors as the carriage 15 slides along the main beam 12, and the electrical signals produced by the photosensors 33 and 34 are processed by the reader head electronics on the circuit board 19 to provide pulse information to an electronic counter 35 which displays the number of fringes that pass the photosensors 33 and 34. Each fringe 43 represents a specific distance of movement of the reader scale 18 relative to the measurement scale 13 and through the flexure assembly 17, the carriage 15 movement relative to main beam 12. A measurement probe 40 (see FIG. 1), when attached by screws 4 to the carriage 15, then can be positioned to coincide with a reference surface 36 and zero button 37 pushed to zero the electronic counter 35. As the carriage and the probe 40 are moved vertically (as they are guided by the bearings 16 along the main beam 12), the height of the probe 40 is accurately displayed on the electronic counter 35 in either inches or millimeters. A dust cover 38 also is provided to protect the operating mechanism from contaminates.

Figure 3:
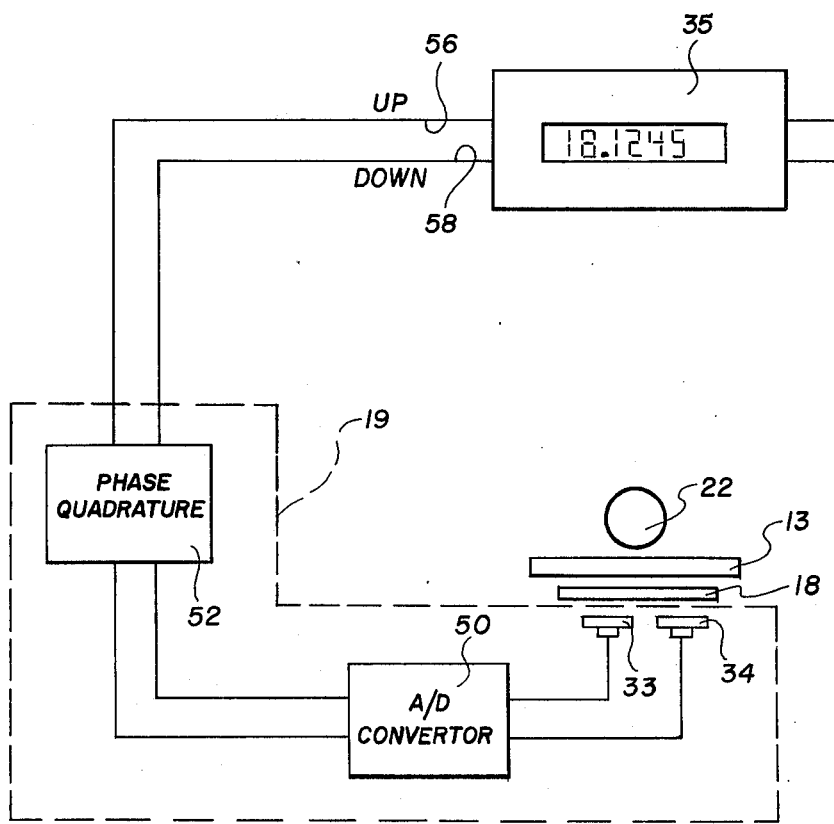
FIG. 3 is a schematic diagram of electronics which may be used in the printed circuit board of the height gage of FIG. 1.
Figure 4A:
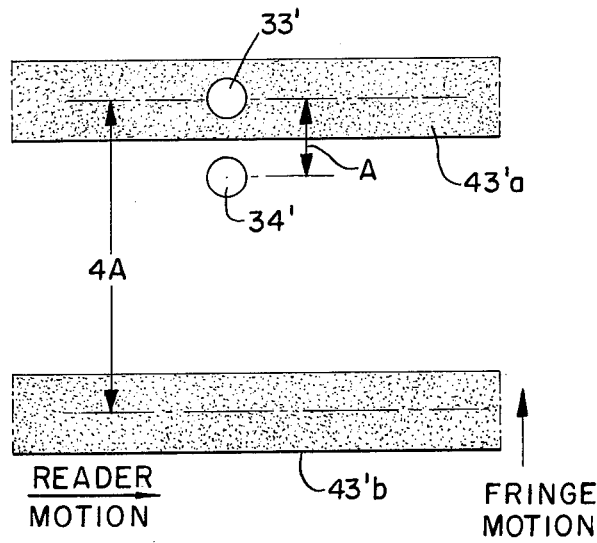
FIGS. 4A and 4B show Moiré fringe patterns for measurement and reader scales, where their scale markings are precisely aligned and askewed, respectively.
Figure 4B:
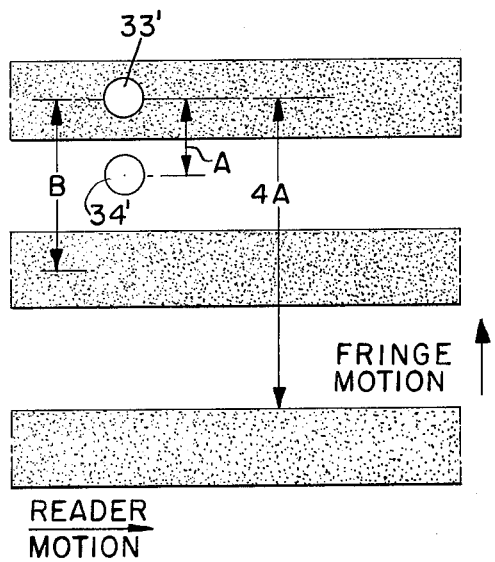

Referring now to FIG. 3, light from the source or lamp 22 illuminates the reader and measurement scales 18 and 13, which, when there is relative movement therebetween, cause fringe patterns which will be understood to those skilled in the art. These fringes or modulated lights illuminate the photosensors 33 and 34, which produce substantially sinusoidal electrical signals which are 90° out-of-phase with each other. These signals are provided to an analog-to-digital converter (A/D) 50 which translates these electrical signals into square waves. A phase quadrature device 52 determines the relative phase therebetween and provides a square wave signal on either its output up line 56 or down line 58. These lines 56 and 58 are connected to the electronics up/down counter 35 which provides a visual readout. The switch 37, which when depressed causes the counter 35 to return to zero, is shown in schematic form. From the foregoing, it should now be clear that the number of cycles of either of the photosensors 33 or 34 determines the distance the probe 40 has traveled while the phase relationship between these signals represents the direction of travel of the probe relative to the beam member 12.

Figure 7:
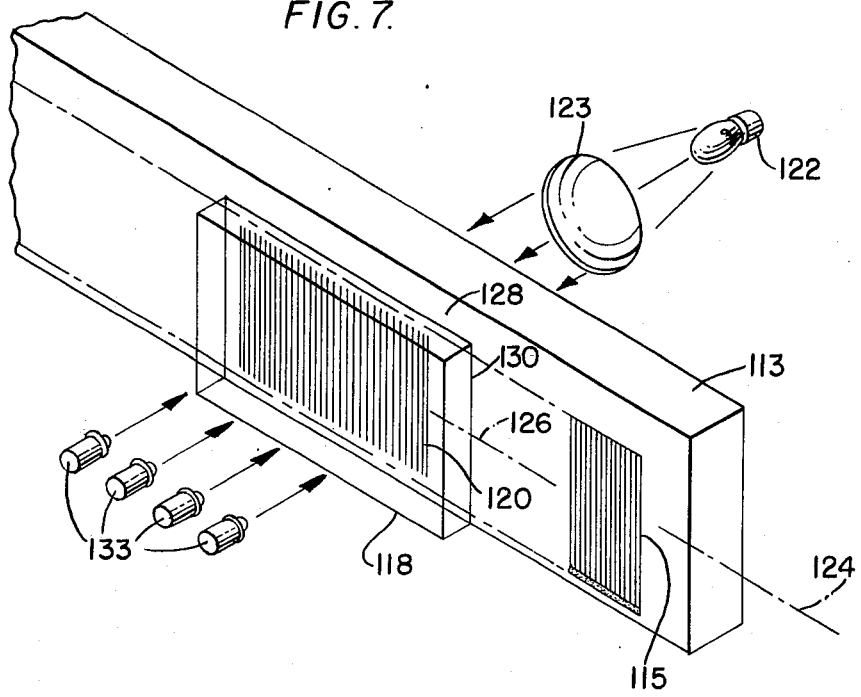
FIG. 7 is a perspective view of a reader and a measurement scale in combination with photosensors and a light source in accordance with a further improved embodiment of this invention.

With respect to FIG. 7, there is shown a further embodiment of this invention, particularly adapted to compensate for those problems associated with askewing of the reader and measurement scales. In particular, there is shown a measurement scale 113 having a plurality of close, equally-spaced scale marks or lines 115, disposed upon a first surface 128 thereof. A reader scale 118 is aligned with and disposed adjacent to the measurement scale 113 and had disposed upon a surface 130 disposed adjacent the surface 128 of the measurement scale 113, a plurality of close, equally-spaced lines or scale marks 120. In an illustrative mode of manufacture, a master scale is diamond-engraved with a precision interferrometrically-controlled ruling engine in a controlled environment, with accuracy traceable to the National Bureau of Standards. The measurement scale 113 and the reader scale 128 are reproduced by a photoreproduction process from their own distinct master scales. Typically, the lines 115 and 120 are accurately-controlled deposits of chrome. The accuracy of the system is dependent upon the uniformity of the distance between the adjacent chrome lines 115 and 120 on the measurement scale 113 and the reader scale 118, and the resolution of the entire system is dependent upon the number of lines per unit of distance. As shown in FIG. 7, a source of light 122 is focused by an associated lens 123 to form a relatively narrow beam of light directed to be intersected by the lines 115 and 120. Moiré fringes are produced when interference between lines 115 and 120 occur. In particular, light cannot pass through an area where the clear areas on the measurement scale 113 are blocked by the line 118 on the reader scale 128, and vice versa. Significantly, the number of lines 115 per unit distance is made slightly differently from that of the lines 120, whereby alternate light and dark areas of the Moiré fringe pattern are produced, i.e. light areas being produced where the chrome light 115 and 120 are in-line with each other, and dark areas where the chrome lines 115 and 120 are out-of-line. The Moiré fringe pattern of light and dark areas is detected by a plurality of photosensors 133, typically phototransistors. It is contemplated that the measurement scales 113 and 118 could be substituted for those included within that embodiment shown in FIGS. 1–3 and 6.

Figure 5A:
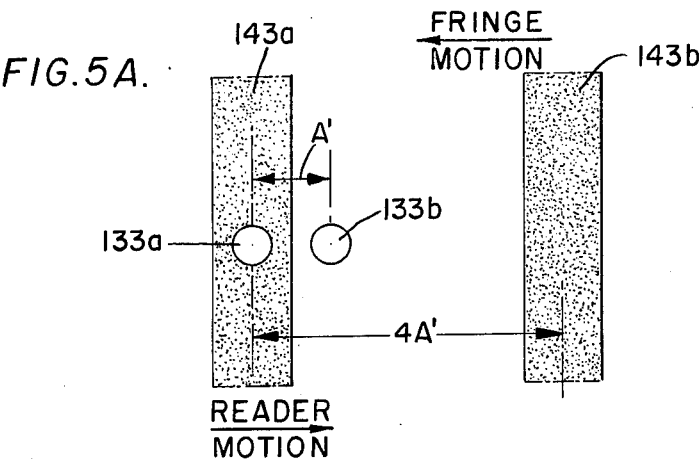
FIGS. 5A and 5B show Moiré fringe patterns created by an improved reader and measurement scale as shown in FIG. 7, wherein the line marks are aligned and askewed, respectively.

As shown in FIG. 7, the lines 115 are disposed substantially prallel with each other and perpendicular to an axis 124 of the measurement scale 113, whereas the lines 120 are disposed substantially parallel with each other and perpendicular to an axis 126 of the reader scale 120. When the scales 113 and 118 are aligned, i.e. their axes 124 and 126 are disposed substantially parallel to each other, the light and dark areas will be vertical to each other as shown in FIG. 5A, where the shadows 143a and 143b are so shown. In order to detect the Moiré pattern of light and dark areas, the photosensors 133a and 133b are disposed a distance A' apart, as shown in FIG. 5A. Significantly, the distance A' is related to the difference between the lines per unit distance of the lines 115 and the lines per unit distance of the line 118, in accordance with the formula:

$$4A' = \frac{1}{F_1 - F_2},$$

where $F_1$ equals the scale line period of the reader scale 120, and $F_2$ equals the scale line period of the measurement scale 113. In one particular example, the lines 115 are formed with a period of 500 lines per inch, whereas the lines 118 are formed with a period of 502.5 lines per inch, resulting in a difference of 2.5. Thus, in the illustrative example where the difference equals 2.5, the spacing A' equals 0.1 inch and the spacing 4A' between the fringes 143a and 143b is 0.4 inch. The relative motion of the fringe pattern sensed by the photosensors 133a and 133b is 0.4 inch, corresponding to a line spacing or pitch on the measurement scale of 0.002 inch, thus providing an effective magnification of 200 for this illustrative embodiment.

Figure 5B:
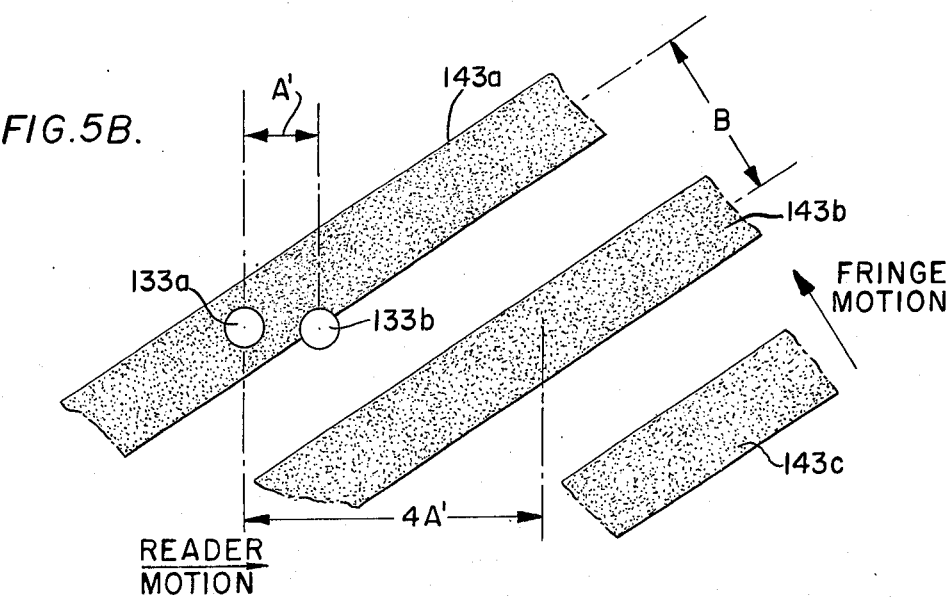

A significant advantage of the embodiment of this invention shown in FIG. 7 is illustrated in FIG. 5B, wherein there is shown a Moiré fringe pattern resulting from the misalignment of the measurement scales 113 and 118. With respect to FIG. 7, it is contemplated that during the continued use of the measuring apparatus of this invention, the measurement scale 113 and the reader scale 118 and in particular the axes 124 and 126 will be disposed in a nonparallel or askewed relationship, resulting in the shifted Moiré pattern of FIG. 5B. In contrast to the scales of some prior art devices where the spacing of the fringes or shadows of a Moiré pattern and in particular the spacing of the photosensors to detect the pattern, is dependent upon the angle θ between the lines, the spacing A' of the photosensors 133a and 133b of the embodiment of FIG. 7 is dependent primarily upon the difference between the period of the lines 115 and 118 so that when there is a slight misalignment and in particular askewing of up to 10° between the axes 124 and 126, the spacing A' will remain substantially the same and as a result, the outputs of the phototransistors or photosensors 133a and 133b will remain accurate to provide a manifestation, as upon a suitable digital display 35 shown in FIG. 3, with continued accuracy, despite the misalignment.

Figure 8:
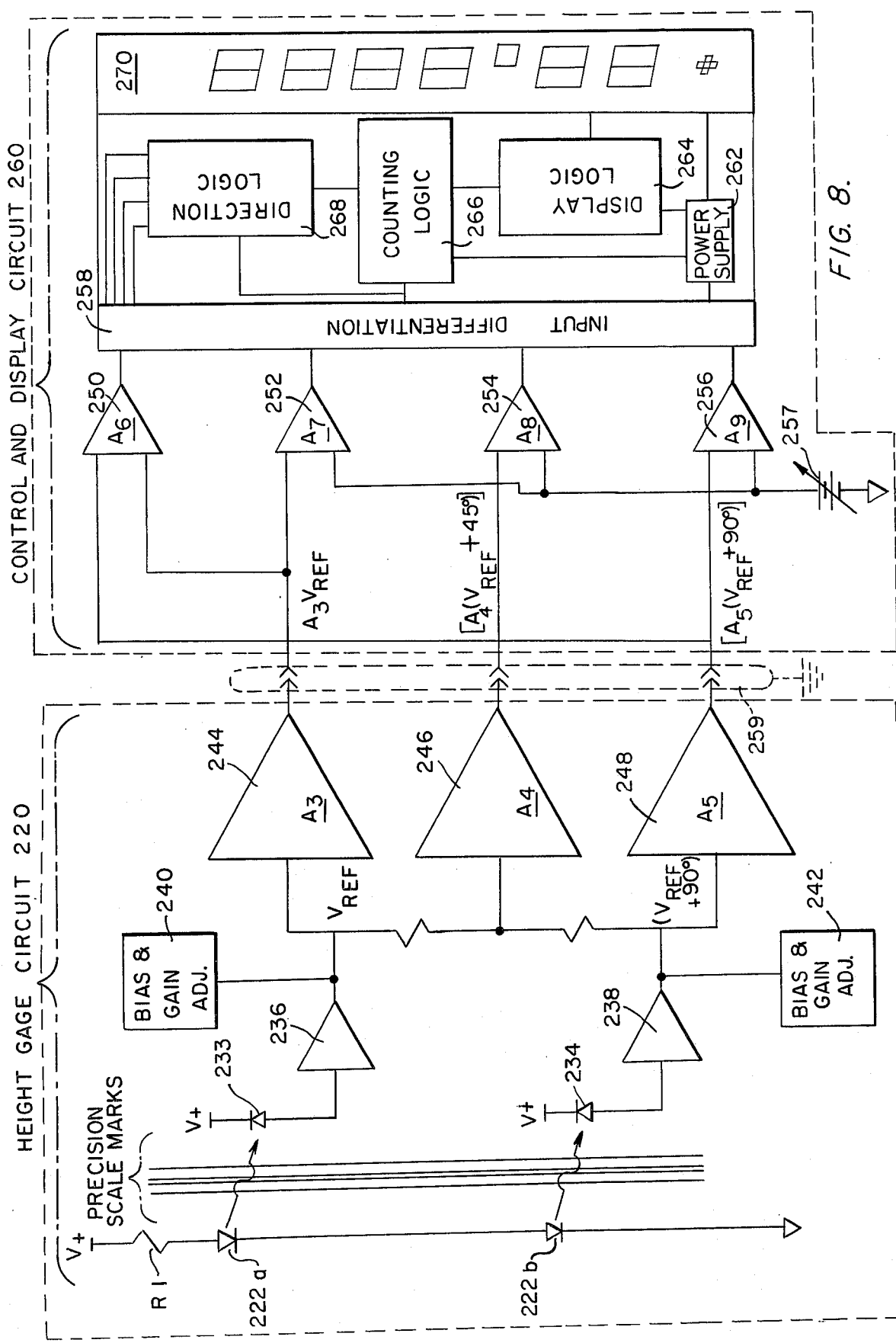
FIG. 8 is a schematic diagram of a further embodiment of the electronics that may be incorporated into the circuit board shown in FIG. 1.

In FIG. 8, there is shown an alternative embodiment of the electrical circuitry that may be used to process and display the outputs of the photosensors. A height gage circuit 220 is energized by infrared light emitted from light sources such as LED's 222a and 222b, whose operating current is determined by resistor R1. Their light output is directed through a set of precision scale marks (see FIG. 7) which produce a Moiré fringe pattern that reflects mechanical motion of either the measurement or reader scale and produces modulation of the infrared light beams. This light modulation is detected by photosensors 233 and 234, whose spacing is chosen, as described above, to provide a phase shift of 90° between their output signals. These signals then are fed to impedance buffer amplifiers 236 and 238, which match the output impedance of the photosensors 222a and 222b to the bias and gain adjusting networks 244, 246 and 248. Networks 244 and 248 are voltage amplifiers that provide analog output signals of $A_3 V_{REF}$ and $A_5(V_{REF} + 90°)$, respectively, where $V_{REF}$ can be represented as $A(\text{Sin } wt)$. Network 246 is a summing amplifier which adds the signals $V_{REF}$ and $V_{REF} + 90°$ to provide an analog output signal $A_4(V_{REF} + 45°)$. The gains of the networks 244, 246 and 248 are adjusted by circuits 240 and 242 to provide symmetrical output signals through an interconnecting cable 259 to a display and control circuit 260 and in particular, to its input buffer amplifiers 250, 252, 254 and 256. These buffer amplifiers are matched to the impedance of the interconnecting cable 259 and act as comparators to convert offset analog voltage signals to digital signals. An adjustable power reference source 257 compensates for offset to insure zero crossing conversion. This conversion produces four digital signals with a 45° phase shift between successive edges of these signals. Differentiation by circuit 258 of the edges of these signals produces digital pulses, the number of which is directly related to the distance transversed by one of the precision scales with respect to the other. Processing and counting of these information pulses are handled by the control and display unit which present outputs to a visible numeric display 270, indicative of the relative total distance. As shown, the number of such pulses are counted by counting logic 266 in either an upward or downward direction, as controlled by the output of a direction logic 268.

The present invention has been described in detail with particular reference to a preferred embodiment thereof; therefore, it should be understood that variations and modifications may be effected within the spirit and scope of the instant invention.

What is claimed is:

1. A measurement device using Moiré fringes produced between a measurement scale and a relatively movable reader scale, said scales having respective optical rulings of different numbers of lines per unit of distance, said respective rulings being disposed generally parallel with each other, and said measurement device comprising:
   a. a beam member;
   b. said measurement scale being secured to said beam member to extend in a direction parallel with a surface of said beam member;
   c. a carriage movable along said beam member and guided by said surface of said beam member;
   d. a reader head supporting said reader scale and mounted on said carriage for movement therewith along said measurement scale in a direction parallel with said measurement scale;
   e. a flexure hinge secured to said reader head and to said carriage and extending generally parallel to said measurement scale for fixing said reader head relative to said carriage againt any motion in a direction parallel with said measurement scale and for allowing limited motion of said reader head in directions transverse to said measurement scale;
   f. bearings on said reader head disposed for engaging said measurement scale and positioning said reader scale in parallel relation to said measurement scale; and
   g. flexure spring means mounted on said carriage and having a free end engaging said reader head for resiliently urging said reader head toward said measurement scale to press said bearings against said measurement scale and hold said reader scale in parallel relation with said measurement scale.

2. The measurement device of claim 1 wherein said bearings are arranged on opposite lateral sides of said respective rulings of said reader scale and said measurement scale.

3. The measurement device of claim 1 wherein said free end of said spring means moves relative to said reader head as said reader head moves in said directions transverse to said measurement scale.

4. The measurement device of claim 3 wherein said bearings are arranged on opposite lateral sides of said respective rulings of said reader scale and said measurement scale.

* * * * *

UNITED STATES PATENT OFFICE
CERTIFICATE OF CORRECTION

Patent No. 4,037,325             Dated July 26, 1977

Inventor(s) Ernest G. Weber et al.

It is certified that error appears in the above-identified patent and that said Letters Patent are hereby corrected as shown below:

The title should read -- Linear Glass Scale Gage --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*